(12) United States Patent
Robitaille

(10) Patent No.: US 7,821,708 B2
(45) Date of Patent: Oct. 26, 2010

(54) METHOD AND APPARATUS FOR ILLUMINATING A RETICLE

(75) Inventor: Blaise R. J. Robitaille, Penetanguishene (CA)

(73) Assignee: Raytheon Company, Waltham, MA (US)

( * ) Notice: Subject to any disclaimer, the term of this patent is extended or adjusted under 35 U.S.C. 154(b) by 160 days.

(21) Appl. No.: 11/923,129

(22) Filed: Oct. 24, 2007

(65) Prior Publication Data
US 2009/0109529 A1  Apr. 30, 2009

(51) Int. Cl.
G02B 23/00 (2006.01)
F41G 1/38 (2006.01)

(52) U.S. Cl. .............. 359/428; 359/399; 359/424; 42/123

(58) Field of Classification Search .......... 359/399–430
See application file for complete search history.

(56) References Cited

U.S. PATENT DOCUMENTS

| | | | | |
|---|---|---|---|---|
| 3,121,163 A | * | 2/1964 | Rickert | 250/467.1 |
| 3,514,184 A | * | 5/1970 | Vogl | 359/636 |
| 3,552,819 A | | 1/1971 | Mandler | |
| 4,710,636 A | * | 12/1987 | Martino | 250/467.1 |
| 4,743,765 A | * | 5/1988 | Ekstrand | 250/467.1 |
| 4,806,007 A | | 2/1989 | Bindon | |
| 4,981,331 A | * | 1/1991 | Taylor | 359/896 |
| 5,052,782 A | * | 10/1991 | Myer | 359/827 |
| 5,065,520 A | * | 11/1991 | Shimizu et al. | 42/123 |
| 5,434,704 A | | 7/1995 | Connors et al. | |
| 5,456,035 A | | 10/1995 | Stiles | |
| 5,653,034 A | | 8/1997 | Bindon | |
| 5,771,623 A | | 6/1998 | Pernstich et al. | |
| 5,924,234 A | | 7/1999 | Bindon | |
| 6,031,604 A | | 2/2000 | Pniel | |
| 6,313,943 B1 | * | 11/2001 | Ikado et al. | 359/368 |
| 6,721,095 B2 | | 4/2004 | Huber | |
| 6,807,742 B2 | | 10/2004 | Schick et al. | |
| 7,440,185 B1 | * | 10/2008 | Thorpe et al. | 359/429 |
| 2003/0086165 A1 | * | 5/2003 | Cross et al. | 359/424 |
| 2004/0047586 A1 | | 3/2004 | Schick et al. | |
| 2004/0201886 A1 | | 10/2004 | Skinner et al. | |

(Continued)

OTHER PUBLICATIONS

U.S. Appl. No. 11/368,850, filed Mar. 6, 2006 by inventors William Conrad Stenton and Brien D. Ross for "Method and Apparatus for Using a Lens to Enhance Illumination of a Reticle", 19 pages of text, 4 pages of drawings.

(Continued)

Primary Examiner—Thong Nguyen
(74) Attorney, Agent, or Firm—Haynes and Boone LLP

(57) ABSTRACT

An apparatus has structure with a reticle oriented approximately parallel to and adjacent an imaginary plane. The structure includes on one side of the plane a portion transmissive to visible radiation, the portion having a surface that is spaced from and angled with respect to the plane, and that faces away from the reticle. A reticle illumination section emits radiation adjacent the surface. According to a different aspect, a method involves: providing a reticle oriented approximately parallel to an imaginary plane and disposed immediately adjacent the plane; providing on one side of the plane a structural portion that is transmissive to visible radiation; forming on the portion a surface spaced from the plane, oriented at an angle to the plane, and oriented to face away from the reticle; and emitting radiation adjacent the surface.

21 Claims, 2 Drawing Sheets

U.S. PATENT DOCUMENTS

2005/0252062 A1    11/2005    Scrogin et al.

OTHER PUBLICATIONS

U.S. Appl. No. 11/368,855, filed Mar. 6, 2006 by inventor William Conrad Stenton for "Method and Apparatus for Combining Light from Two Sources to Illuminate a Reticle", 19 pages of text, 4 pages of drawings.

U.S. Appl. No. 11/497,902, filed Aug. 1, 2006 by inventor William Conrad Stenton for "Method and Apparatus for Efficiently Collecting Radiation", 22 pages of text, 3 pages of drawings.

Notice of Allowance mailed Apr. 8, 2008 in U.S. Appl. No. 11/368,850, filed Mar. 6, 2006.

Office Action mailed May 12, 2008 in U.S. Appl. No. 11/368,855, filed Mar. 6, 2006.

Office Action mailed Nov. 11, 2007 in U.S. Appl. No. 11/368,850, filed Mar. 6, 2006.

* cited by examiner

METHOD AND APPARATUS FOR ILLUMINATING A RETICLE

FIELD OF THE INVENTION

This invention relates in general to weapon sights and, more particularly, to techniques for illuminating a reticle in a weapon sight.

BACKGROUND

Over the years, various techniques have been developed to help a person accurately aim a weapon such as a rifle. One common approach is to mount a sight or scope on the weapon. A person then uses the sight or scope to view an image of a scene that includes an intended target. Existing sights usually superimpose a reticle on the image of the scene. For example, the reticle may be in the form of crosshairs.

Under certain circumstances, including low levels of ambient light, it may be advantageous if the reticle is illuminated to increase its visibility. Various techniques have previously been developed for illuminating a reticle. Although these known techniques have been generally adequate for their intended purposes, they have not been satisfactory in all respects.

BRIEF DESCRIPTION OF THE DRAWINGS

A better understanding of the present invention will be realized from the detailed description that follows, taken in conjunction with the accompanying drawings, in which.

DETAILED DESCRIPTION

Figure 1:
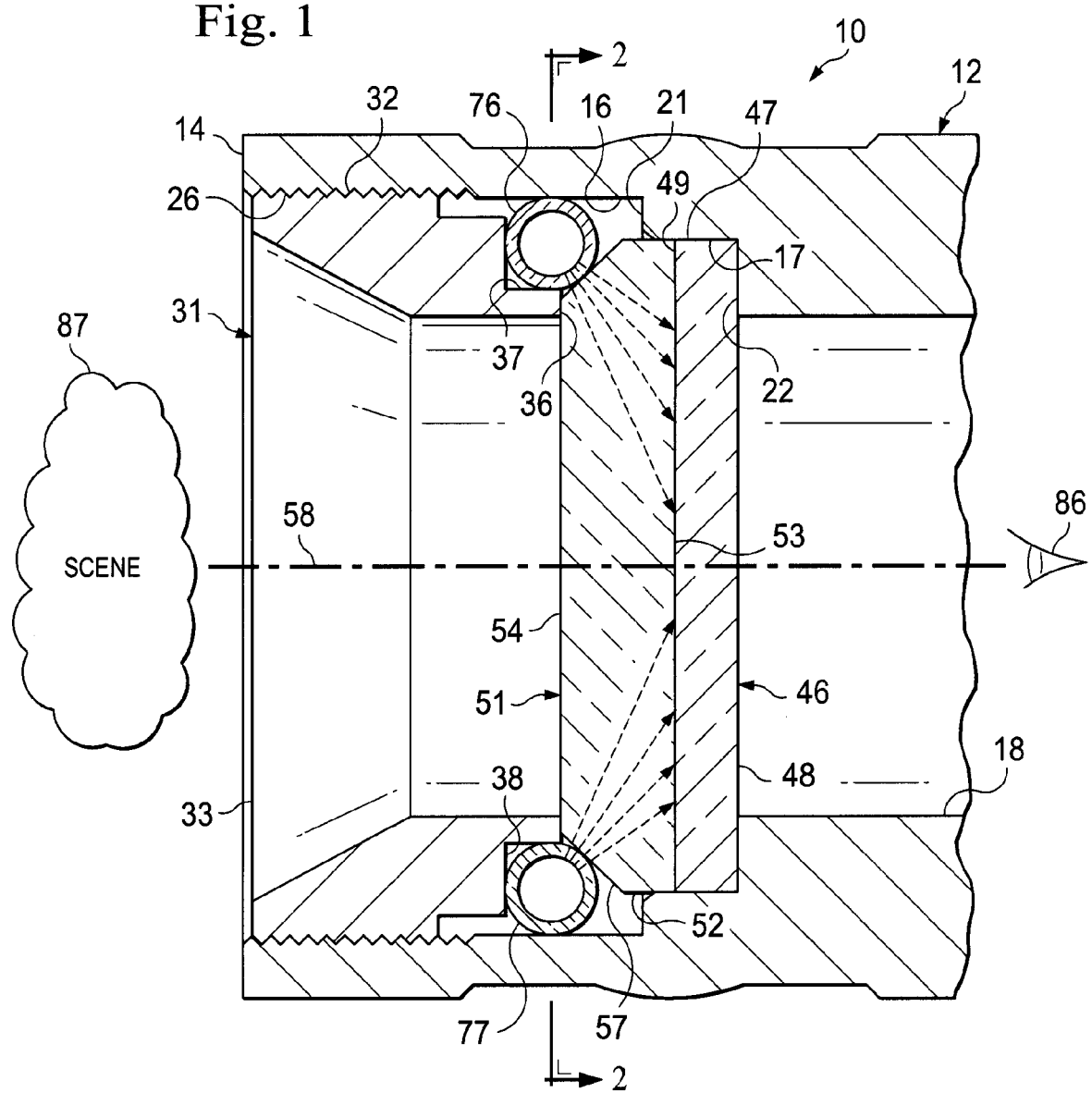
FIG. 1 is a diagrammatic fragmentary sectional side view of an apparatus that is part of a weapon sight, and that in particular is an illuminated reticle assembly.
Figure 2:
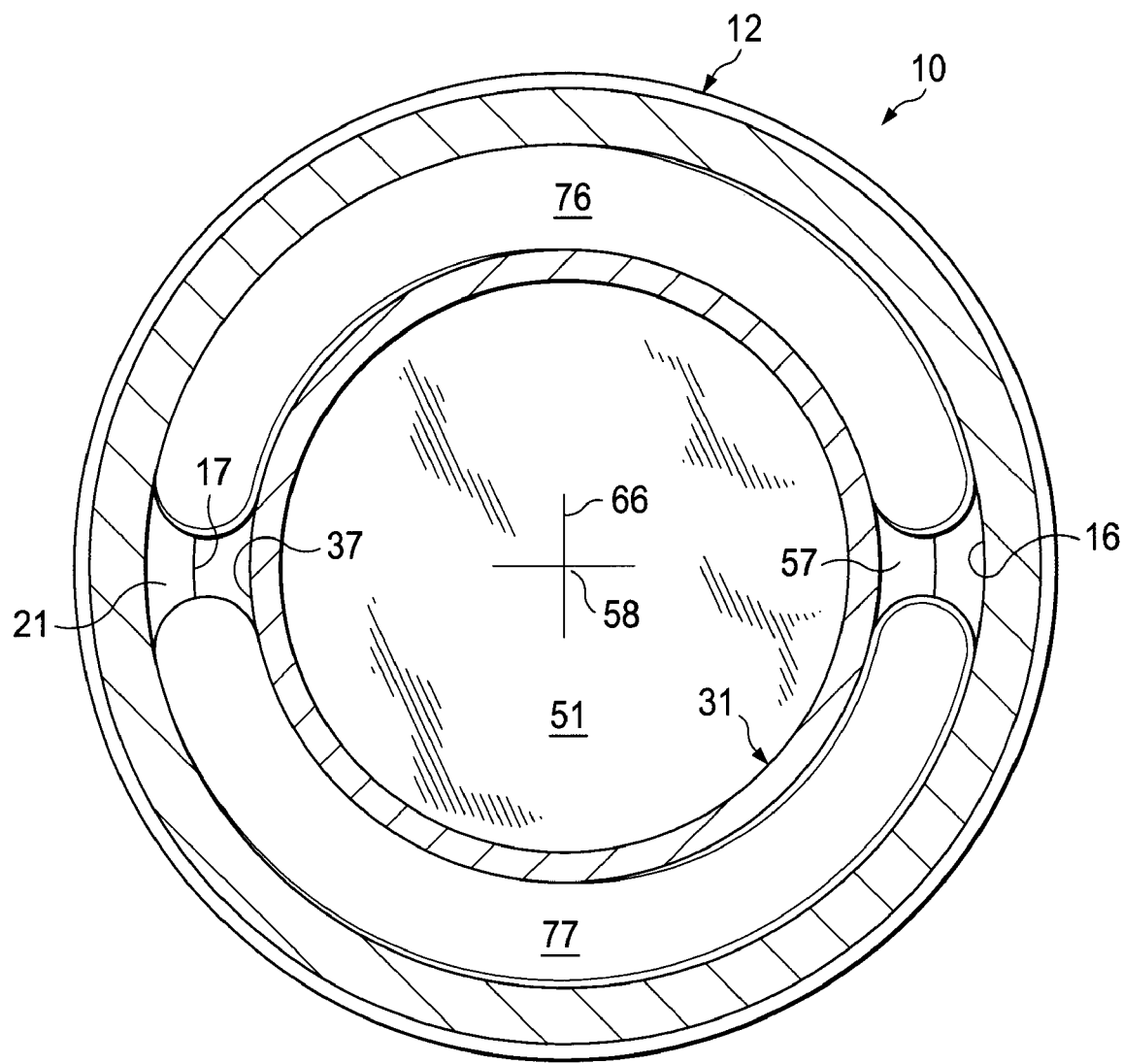
FIG. 2 is a diagrammatic sectional view taken along the section line 2-2 in FIG. 1.

FIG. 1 is a diagrammatic fragmentary sectional side view of an apparatus that is part of a weapon sight, and that in particular is an illuminated reticle assembly 10. FIG. 2 is a diagrammatic sectional view of the assembly 10, taken along the section line 2-2 in FIG. 1. With reference to FIGS. 1 and 2, the assembly 10 includes an approximately cylindrical tube 12. In the disclosed embodiment, the tube 12 is made of aluminum, but it could alternatively be made of any other suitable material. The tube 12 has at one end an axially-facing annular end surface 14. The interior of the tube 12 includes three radially-inwardly surfaces 16, 17 and 18 that are each approximately cylindrical. The surfaces 16, 17 and 18 decrease progressively in diameter in a direction away from the end surface 14. An axially-facing annular shoulder 21 is provided between the surfaces 16 and 17, and an axially-facing annular surface 22 is provided between the surfaces 17 and 18. The axial half of surface 16 that is closest to the end surface 14 has internal threads 26.

The assembly 10 also includes a holding ring 31. The holding ring 31 has external threads 32 that engage the internal threads 26 on the tube 12. In the disclosed embodiment, the holding ring 31 is made of aluminum, but it could alternatively be made of any other suitable material. The holding ring 31 has one end 33 that is approximately flush with the end surface 14 on the tube 12. At the opposite axial end, the ring 31 has an axially-facing annular end surface 36. Adjacent the end surface 36, the ring 31 has a radially outwardly facing support surface 37 that is approximately cylindrical. At the end of the support surface 37 remote from end surface 36, the holding ring 31 has an annular shoulder 38 that faces in the same axial direction as the end surface 36.

The assembly 10 further includes a glass plate 46 that is a circular disc. The plate 46 is transmissive to visible radiation. The plate 46 has a radially-outwardly facing peripheral edge surface 47 that is adjacent the cylindrical surface 17 on the tube 12. The plate 46 also has planar and parallel side surfaces 48 and 49 on opposite sides thereof. The outer edge of the side surface 48 engages the annular shoulder 22 on the tube 12.

The assembly 10 includes a further glass plate 51 that is a circular disc, and that is transmissive to visible radiation. The plate 51 has a radially-outwardly facing peripheral edge surface 52 that is adjacent the surface 17 on the tube 12. The plate 51 has two planar and parallel side surfaces 53 and 54 on opposite sides thereof. The side surface 53 is in direct contact with the side surface 49 on the plate 46. The outer edge of the side surface 54 engages the annular end surface 36 on the holding ring 31. Thus, the plates 46 and 51 are both held against axial movement by the surfaces 22 and 36, and are both held against radial movement by the surface 17.

The plate 51 has, between the peripheral edge surface 52 and the side surface 54, an annular bevel surface 57. The bevel surface 57 is a polished frustoconical surface with an axis that is coincident with a central axis 58 of the assembly 10. The axis 58 is perpendicular to an imaginary plane defined by the adjacent side surfaces 49 and 53. The bevel surface 57 extends at an angle with respect to the plane of the surfaces 49 and 53. This angle may be within a range of approximately 25° to 65°. In the disclosed embodiment, the angle is approximately 45°.

In the region of adjacent side surfaces 49 and 53, a reticle 66 is provided (FIG. 2). In the disclosed embodiment, the reticle 66 has a simple "crosshair" configuration. However, the reticle 66 could have any other desired configuration. The axis 58 extends through a central region of the reticle 66. In the disclosed embodiment, the reticle 66 is formed by using a known glass etching or engraving technique to etch or engrave the pattern of the reticle into either the side surface 49 of glass plate 46 or the side surface 53 of glass plate 51. The grooves or other recesses resulting from the etching or engraving are optionally filled with a material that is reflective, florescent or phosphorescent, as discussed in more detail later. In the disclosed embodiment, this material is titanium oxide and sodium silicate, but it could alternatively be any other suitable material. After the recesses are filled with this material, the side surfaces 49 and 53 of the glass plates 46 and 51 are bonded together with an optical grade cement of a type that is known in the art and readily commercially available. In the disclosed embodiment, this is a type of cement that cures when exposed to ultraviolet (UV) radiation. however, the cement could alternatively be cured in any other suitable manner.

The assembly 10 includes two tritium light sources 76 and 77, each of which is a component that is readily commercially available. Each light source 76 and 77 is elongate and arcuate, where the angle of arc is in the range of approximately 120° to 180°. In the disclosed embodiment, the light sources 76 and 77 are identical, but they could alternatively be different. Each of the light sources 76 and 77 is a radioluminescent capsule having a tubular shell that is made of glass or some other suitable material, and that is closed at each end. A phosphor coating is provided on the inner surface of the capsule. The capsule contains tritium, which is a radioactive isotope of hydrogen having atoms with three times the mass of ordinary light hydrogen atoms. As the tritium material decays, it emits soft beta rays that, when they strike the phosphor coating, are converted into visible light. The half life of tritium is approximately 12.5 years. Thus, as a practical matter, the tritium light sources 76 and 77 each have a usable life of more than 15 years. Consequently, the tritium light sources 76 and 77 each glow continuously for a long time, thereby providing a safe and reliable source of light, without any need for a power source such as a battery.

The tritium light sources 76 and 77 are supported on the holding ring 31 at respective locations that are circumferentially offset. Each of the light sources 76 and 77 engages the support surface 37, and also the axial shoulder 38. Each of the light sources 76 and 77 is fixedly secured to the axial shoulder 38 by a suitable adhesive, such as a commercially-available epoxy adhesive. With reference to FIG. 1, when the holding ring 31 is installed in the tube 12, each of the light sources 76 and 77 is adjacent the cylindrical surface 16 on the tube 12, and engages the bevel surface 57 on the glass plate 54.

Radiation emitted by the light sources 76 and 77 is represented diagrammatically in FIG. 1 by broken-line arrows. This radiation passes through the bevel surface 57, and then travels through the plate 57 to the reticle 66 (FIG. 2). In the disclosed embodiment, the reticle 66 is reflects this radiation. However, depending on the wavelength of the radiation and the material used for the reticle, it would alternatively be possible for the reticle to fluoresce or phosphoresce in response to the radiation, or to respond in some other manner to the radiation.

When the eye 86 of a user views a distant scene 87 through the assembly 10, the reticle 66 is superimposed on the image of the scene 87. The reticle 66 is more readily visible to the user as a result of the radiation from the light sources 76 and 77, particularly when the ambient light external to the sight is relatively low. The use of the bevel surface 57 allows for a relatively compact and lightweight assembly, which can be particularly beneficial for use on small, portable weapons, such as a rifle. The reticle is reliably illuminated, without obstructing the optical view of the user, in devices where backlighting of the reticle is not practical (for example where a device has only spherical lenses and no reflecting prism surfaces that could be backlit). Although the invention encompasses the use of battery powered light sources, the disclosed tritium sources are advantageous because they avoid the need to periodically replace a battery.

Although the disclosed embodiment uses two tritium light sources, 76 and 77, it would alternatively be possible to use only a single tritium light source having a longer arc length, or a larger number of tritium light sources each having a shorter arc length. In addition, it would be possible to use types of light sources other than tritium light sources. For example, instead of the tritium light sources, it would be possible to use a light pipe that receives illumination at one end region from a light emitting diode (LED), or from ambient daylight outside the weapon sight, and that has an opposite end regions extending along the bevel surface 57 and emitting the illumination. The light pipe could, for example, be a fluorescent fiber of a known type. As is known in the art, a fluorescent fiber has a core that is made from a material such as polystyrene, and that is surrounded by a cladding made from a material such as a clear acrylic. The core is doped with a special fluorescent dye. Ultraviolet light (for example from ambient daylight) can pass through the cladding and into the core, where the fluorescent dye absorbs the ultraviolet light and then emits visible light. The material of the dye determines the color of the visible light that is produced. Due to differences in the refractive indexes of the cladding and core, the visible light is trapped within the core, and is reflected toward an end region of the fiber. In that end region, the cladding may be a material with a different index of refraction that allows the visible light to escape.

Although one selected embodiment has been illustrated and described in detail, it should be understood that a variety of substitutions and alterations are possible without departing from the spirit and scope of the present invention, as defined by the claims that follow.

What is claimed is:

1. An apparatus comprising:
   a first part;
   structure that is supported on said first part and that includes a reticle oriented approximately parallel to an imaginary plane and disposed immediately adjacent said plane, said structure further including on one side of said plane a portion that is transmissive to visible radiation, said portion having a surface thereon that is spaced from said plane, oriented at an angle to said plane, and oriented to face away from said reticle;
   a second part detachably coupled to said first part; and
   a reticle illumination section that is supported on said second part and disposed adjacent said surface, and that emits radiation.

2. An apparatus according to claim 1, wherein said reticle illumination section engages said surface.

3. An apparatus according to claim 1, wherein said surface is annular.

4. An apparatus according to claim 3, wherein said reticle illumination section includes a portion that is elongate, that extends along said annular surface in engagement therewith, and that emits radiation.

5. An apparatus according to claim 4,
   wherein said surface is frustoconical with an axis that extends through a central region of said reticle approximately perpendicular to said plane; and
   wherein said portion of said reticle illumination section is arcuate.

6. An apparatus according to claim 3, wherein said reticle illumination section includes a plurality of portions that engage said annular surface at circumferentially spaced locations therealong, and that each emit radiation.

7. An apparatus according to claim 6, wherein said portions of said reticle illumination section are each elongate.

8. An apparatus according to claim 7,
   wherein said surface is frustoconical with an axis that extends through a central region of said reticle approximately perpendicular to said plane; and
   wherein said portions of said reticle illumination section are each arcuate.

9. An apparatus according to claim 8,
   wherein said reticle illumination section includes only two of said arcuate portions; and
   wherein said portions of said reticle illumination section each have an angle of arc that is in the range of 120° to 180°.

10. An apparatus according to claim 1, wherein said reticle is one of reflective, fluorescent, and phosphorescent in response to said radiation from said reticle illumination section.

11. An apparatus according to claim 1,
    wherein said structure includes a member transmissive to visible radiation and having thereon a surface that is substantially parallel to and coincident with said plane, said portion of said structure being a portion of said member; and
    wherein said reticle includes a pattern created in said surface of said member by one of etching and engraving.

12. An apparatus according to claim 11, wherein said reticle includes a material that is disposed in said pattern and that is one of reflective, fluorescent, and phosphorescent in response to said radiation from said reticle illumination section.

13. An apparatus according to claim 1,
wherein said structure includes two members having respective surfaces that face each other and that are each substantially parallel to and coincident with said plane, said portion of said structure being a portion of one of said members; and
wherein said reticle includes a pattern etched in said surface of one of said members.

14. An apparatus according to claim 13, wherein said reticle includes a material that is disposed in said pattern and that is one of reflective, fluorescent, and phosphorescent in response to said radiation from said reticle illumination section.

15. An apparatus according to claim 1, wherein said reticle illumination section includes a tritium light source.

16. An apparatus according to claim 1, wherein said angle is in the range of 25° to 65°.

17. An apparatus according to claim 16, wherein said angle is approximately 45°.

18. An apparatus according to claim 1, wherein said first part is tubular and has an opening therein, said structure, said second part and said reticle illumination section being disposed within said opening in said first part.

19. An apparatus according to claim 18, wherein said surface is frustoconical with an axis that extends through a central region of said reticle approximately perpendicular to said plane; wherein said second part is annular and approximately concentric to said axis; wherein said reticle illumination section includes a portion that is elongate and arcuate, that is fixedly supported on said second part, and that extends along said annular surface approximately concentric to said axis.

20. An apparatus according to claim 19, wherein said opening in said first part has a portion with internal threads; and wherein said second part has external threads that engage said internal threads on said first part to effect said detachable coupling of said first and second parts.

21. An apparatus according to claim 20, wherein said portion of said reticle illumination section is adhesively secured to said second part.

* * * * *